(12) United States Patent
Kellner et al.

(10) Patent No.: US 11,872,899 B2
(45) Date of Patent: Jan. 16, 2024

(54) TRACTION BATTERY SYSTEM FOR A MOTOR VEHICLE AND MOTOR VEHICLE HAVING AN ELECTRIC DRIVE

(71) Applicant: Dr. Ing. h.c. F. Porsche Aktiengesellschaft, Stuttgart (DE)

(72) Inventors: Philipp Kellner, Rennigen (DE); Christopher Volkmer, Niefern-Öschelbronn (DE); Max Falk, Wiesloch (DE); Ilija Brandic, Pleidelsheim (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 142 days.

(21) Appl. No.: 17/367,738

(22) Filed: Jul. 6, 2021

(65) Prior Publication Data

US 2022/0009359 A1  Jan. 13, 2022

(30) Foreign Application Priority Data

Jul. 7, 2020  (DE) ................. 10 2020 117 832.8

(51) Int. Cl.
*B60L 50/60* (2019.01)
*B60K 1/04* (2019.01)

(52) U.S. Cl.
CPC ........... *B60L 50/66* (2019.02); *B60K 1/04* (2013.01)

(58) Field of Classification Search
CPC ............................ B60L 50/66; B60K 1/04
See application file for complete search history.

(56) References Cited

U.S. PATENT DOCUMENTS 10,166,852 B2  1/2019 Ishihara et al.
10,232,697 B2  3/2019 Hara et al.
(Continued)

FOREIGN PATENT DOCUMENTS

DE  102011109024 A1  1/2013
DE  102016204223 A1  9/2017
(Continued)

OTHER PUBLICATIONS

The translation of WO 2018104505 A1 that the action relies on has been included. (Year: 2018).*
(Continued)

*Primary Examiner* — John D Walters
*Assistant Examiner* — Nicholas R. Kandas
(74) *Attorney, Agent, or Firm* — RatnerPrestia

(57) ABSTRACT

A traction battery system of an electrically operable motor vehicle is configured in the form of an underfloor battery and has at least one first battery module and one second battery module. The traction battery system includes a battery assistant module that is designed for operating the battery modules. The battery modules and the battery assistant module, which have an assistant module housing, are oriented in series in relation to one another in the direction of a body longitudinal axis of a motor vehicle body, and can be arranged between a first sill and a second sill of the body. The battery assistant module has a load-transmitting element for transmitting forces acting on side elements of the body, which load-transmitting element extends from the first sill to the second sill in the direction of a body transverse axis of the body.

19 Claims, 2 Drawing Sheets

(56) References Cited

U.S. PATENT DOCUMENTS

| | | | |
|---|---|---|---|
| 10,358,024 | B2 | 7/2019 | Yugami et al. |
| 10,486,514 | B2 * | 11/2019 | Takayanagi ............. B60L 50/70 |
| 2006/0102398 | A1 | 5/2006 | Mizuno |
| 2020/0070671 | A1 * | 3/2020 | Ohkuma |
| 2021/0268975 | A1 * | 9/2021 | Hagi .................. H01M 50/249 |

FOREIGN PATENT DOCUMENTS

| | | | |
|---|---|---|---|
| DE | 102017206852 A1 | | 11/2017 |
| DE | 102017211365 A1 | | 1/2019 |
| DE | 102018205948 A1 | | 10/2019 |
| DE | 102018210699 A1 * | | 1/2020 |
| DE | 102018210699 A1 | | 1/2020 |
| EP | 3345779 A1 | | 7/2018 |
| EP | 3-345-779 A1 * | | 11/2018 |
| EP | 3 345 779 A1 * | | 11/2018 |
| JP | 11180169 A | | 7/1999 |
| JP | 3070353 B2 | | 7/2000 |
| JP | 2004127747 A | | 4/2004 |
| JP | 2012091636 A | | 5/2012 |
| JP | 2018052209 A | | 4/2018 |
| JP | 2019051886 A | | 4/2019 |
| JP | 2019155993 A | | 9/2019 |
| WO | 2017017762 A1 | | 2/2017 |
| WO | WO-2018104505 A1 * | | 6/2018 |
| WO | WO 2018104505 A1 * | | 8/2018 |

OTHER PUBLICATIONS

Great Britain Combined Search and Examination Report for Application No. GB2109789.4, dated Mar. 23, 2022, 7 pages.

Japanese Notice of Reasons for Refusal for Japanese Application No. 2021-107494, dated Jul. 20, 2022 with translation, 11 pages.

* cited by examiner

TRACTION BATTERY SYSTEM FOR A MOTOR VEHICLE AND MOTOR VEHICLE HAVING AN ELECTRIC DRIVE

CROSS-REFERENCE TO RELATED APPLICATION

This application claims priority to German Patent Application No. 10 2020 117 832.8, filed Jul. 7, 2020, the content of such application being incorporated by reference herein in its entirety.

FIELD OF THE INVENTION

The invention relates to a traction battery system for a motor vehicle as well as a motor vehicle having an electric drive.

BACKGROUND OF THE INVENTION

Traction battery systems for motor vehicles are known. Said traction battery systems are a large number of battery modules having a plurality of battery cells which are designed for electric driving or partial driving in the form of a hybrid drive. The plurality of battery cells are bundled to form a battery module, wherein a plurality of battery modules are accommodated in a battery housing of the traction battery. The traction battery system is accommodated in an accommodation space in a body of the motor vehicle.

DE 10 2011 109 024 A1, which is incorporated by reference herein, discloses a traction battery system for a motor vehicle, the battery modules and associated components, such as, for example, cooling device, electrical transducer, alternating-current and direct-current converter, of which traction battery system are accommodated in a supporting frame which can be attached to a body of the motor vehicle.

JP 3070353 B2, which is incorporated by reference herein, discloses a motor vehicle having a traction battery system, wherein the traction battery is designed in the form of an underfloor battery, and wherein a body of the motor vehicle has a central tunnel in which a control unit of the traction battery system is accommodated.

DE 10 2017 206 852 A1, which is incorporated by reference herein, discloses a traction battery system for a motor vehicle, the battery modules of which traction battery system are accommodated in a fastening structure which has increased stiffness with respect to a side impact load, wherein a load-transmitting element is provided between battery modules that are arranged next to one another.

A traction battery system for a motor vehicle, the battery modules of which traction battery system are accommodated in a battery housing, wherein at least one deformation element for deformation in the event of a crash is arranged on an inner side of the battery housing, can be found in laid-open specification DE 10 2017 211 365 A1, which is incorporated by reference herein.

Traction battery systems, the traction battery of which are configured in the form of underfloor batteries, usually have battery modules between two side faces of a body of the motor vehicle in a central region of the body, which central region is generally a passenger compartment. A battery assistant system which is designed for operating the traction battery is arranged next to the traction battery, therefore likewise in the central region of the body, which central region is usually situated between two sills of the body, for implementing short connecting paths. The battery assistant system, in respect of its extent in the direction of a body transverse axis of the body, is usually shorter than the battery modules, and for this reason it is not suitable for transmitting a force which acts on the side surfaces, for example in the event of a so-called crash.

SUMMARY OF THE INVENTION

In view of the foregoing challenges disclosed herein is a traction battery system for a motor vehicle, which traction battery system is secured in an improved manner, in particular with respect to an introduction of force from the side. Also disclosed is a motor vehicle having an electric drive, which motor vehicle is secured in an improved manner with respect to an introduction of force at its side faces.

A traction battery system according to aspects of the invention of an electrically operable motor vehicle has a traction battery of the traction battery system, which traction battery is designed in the form of an underfloor battery, having at least one first battery module and one second battery module. The traction battery system further comprises a battery assistant module, which is designed for operating the battery modules, wherein the battery modules and the battery assistant module are oriented in series in relation to one another in the direction of a body longitudinal axis of a body of the motor vehicle, and can be arranged between a first sill and a second sill of the body. According to aspects of the invention, the battery assistant module has a load-transmitting element for transmitting impact forces acting on side elements of the body, which load-transmitting element is designed in a manner extending from the first sill to the second sill in the direction of a body transverse axis of the body. That is to say, in other words, that the load-transmitting element forms a load path from one sill to the other sill for introducing force, as a result of which improved protection of the battery assistant module against the action of force from the direction of the side faces is provided.

If the battery assistant module consists of two components that are formed separately from one another, a battery management system and an integrated power system which has a DC/DC converter, an AC/DC converter and/or a heater of a temperature control system, and the assistant module housing is therefore formed from a battery management system housing of the battery management system and a power system housing of the integrated power system, the main advantage of the load-transmitting system, in spite of separated components, is that of providing a continuous load path in the direction of the body transverse axis.

Therefore, the two systems, the battery management system and the integrated power system which is also called an "integrated power box", can advantageously be arranged in a manner optimized in respect of installation space, with a secured, uninterrupted load path. The advantage of systems which are designed separately from one another can be found, in particular, in the provision of the different systems from different suppliers who respectively specialize in the field of the corresponding system, as a result of which a high-quality system can be used, as a result of which guarantee and goodwill costs can in turn be kept low.

Similarly, the use of load-bearing battery modules for increasing the security of the traction system is advantageous.

A nonpositive connection, preferably in the form of a screw connection, is suitable in principle for secured fastening of the load-transmitting element to the battery assistant module in one-piece form or in two-piece form, wherein connecting points which are provided specifically for fastening purposes are provided on the battery assistant module, in particular on the assistant module housing.

The assistant module housing, or in two-part form the battery management system housing and the power system housing, preferably consists of a frame which has a first cover and a second cover for creating a closed container which is preferably of leaktight design. A nonpositive connection, preferably in the form of the screw connection, can be used for secured fastening of the covers to the frame. Against the background of fastening the load-transmitting element to at least one of the covers as well, this is likewise preferably done with the aid of a screw connection since secure and stable connections can be implemented with screw connections.

In one refinement of the traction battery system according to aspects of the invention, the load-transmitting element is a cover of the assistant module housing. That is to say, in other words, that the load-transmitting element, on its face which is designed facing the frame, is configured for covering the assistant module housing in a secure and leaktight manner. Therefore, a leaktight housing, in particular a housing which is moisture-tight, can be created in a cost-effective manner since additional covers can be dispensed with.

In a further cost-effective manner, the load-transmitting element is produced in an extruded manner. Using this production method, a preferred refinement of the traction battery system, which the load-transmitting element is designed in a manner having a cooling duct, can also be realized in a cost-effective manner. With the aid of the cooling duct which is formed in the load-transmitting element, the load-transmitting element can be used as a cooling element for cooling the battery assistant module. Furthermore, the load-transmitting element therefore has a stabilizing cross section on account of the cooling duct, or preferably a plurality of cooling ducts.

The production of the cover from a plastic, provided that the load-transmitting element is not used as a cover of the assistant module housing, allows this cover to be provided in a cost-effective manner and with a low weight. The frame is produced in the form of a cast or forged part in a cost-effective and stable manner.

Therefore, integration of the load-transmitting element into the traction battery system in a manner optimized in respect of installation space and efficient in respect of weight results overall.

A second aspect of the invention is the provision of a motor vehicle having an electric drive, which motor vehicle is secured in an improved manner in the event of an excessive introduction of force at its side faces, for example in the event of a so-called crash, wherein a traction battery system is arranged between a first sill and a second sill of a body of the motor vehicle.

BRIEF DESCRIPTION OF THE DRAWINGS

Further advantages, features and details of the invention can be found in the description below of preferred exemplary embodiments and with reference to the drawing. The features and combinations of features cited in the description above and the features and combinations of features cited in the description of the figures below and/or shown in the figures alone can be used not only in the respectively indicated combination but also in other combinations or on their own without departing from the scope of the invention. Identical reference signs are assigned to elements that are the same or have the same function. In said figures.

DETAILED DESCRIPTION OF THE INVENTION

Figure 1:
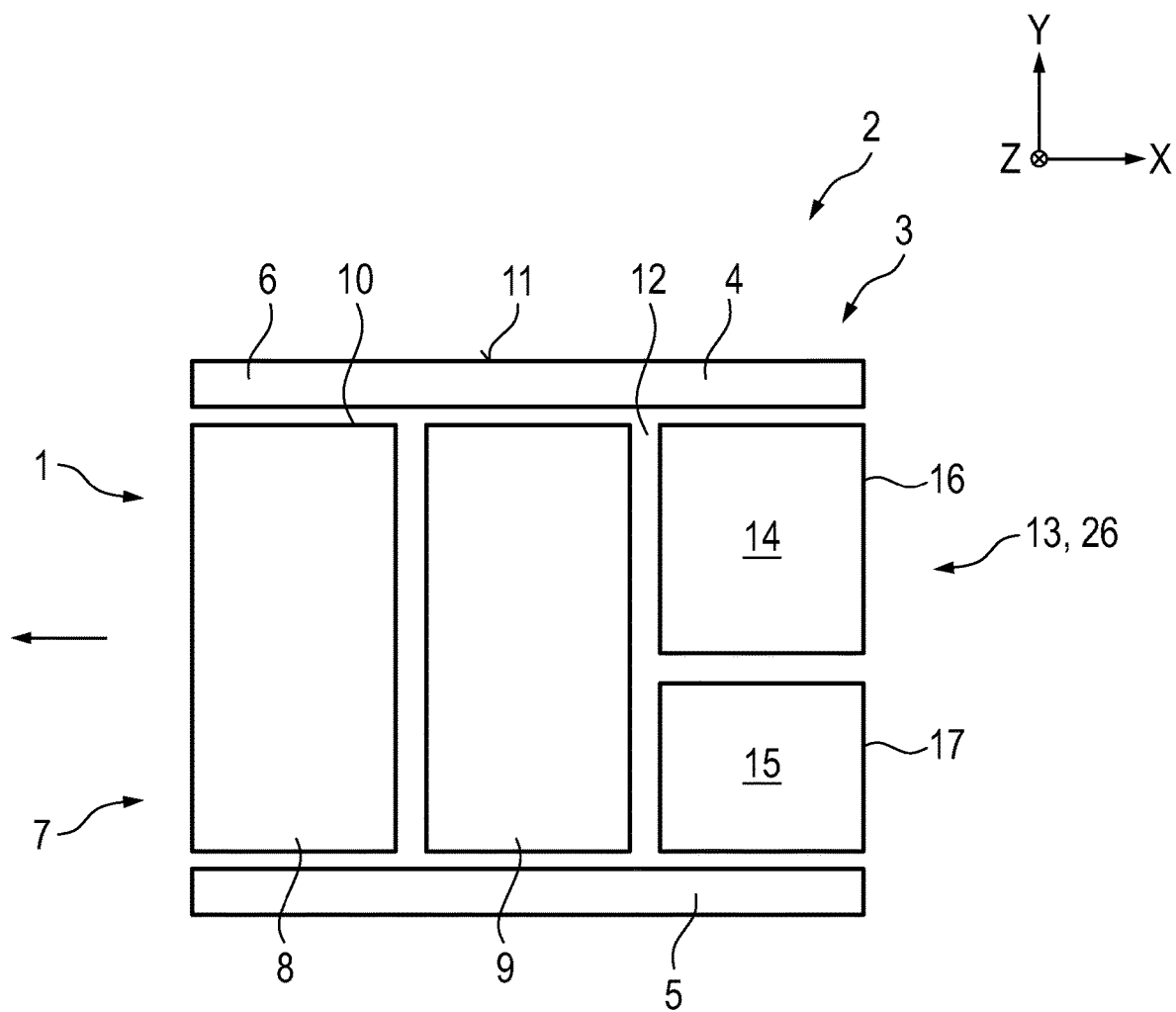
FIG. 1 shows a basic illustration of a traction battery system according to aspects of the invention for a motor vehicle.

FIG. 1 depicts a basic illustration of a traction battery system 1 according to aspects of the invention for a motor vehicle 2, wherein the traction battery system 1 is an electric drive of the motor vehicle 2. The motor vehicle 2 has a body 3 comprising a first sill 4 and a second sill 5, which sills are side elements of a shell 6 of the body 3. A Cartesian coordinate system which illustrates directions of extent of axes of the body 3, a body longitudinal axis X, a body transverse axis Y and a body vertical axis Z, is depicted for improved understanding of the invention.

The body 3 is designed in a manner accommodating the traction battery system 1, wherein the shell 6 is configured for fastening the traction battery system 1. A traction battery 7 of the traction battery system 1, which traction battery is configured in the form of an underfloor battery, comprises at least two battery modules, in the present exemplary embodiment a first battery module 8 and a second battery module 9 which each have a plurality of battery cells, not illustrated in any detail, wherein the plurality of battery cells are respectively accommodated in a battery module housing 10 of the battery module 8; 9. The battery modules 8, 9 are usually of identical construction.

The battery modules 8, 9 are arranged between the two sills 4, 5 in series in the direction of the body longitudinal axis X and are designed as so-called load-bearing battery modules 4, 5. The motor vehicle 2 can be an exclusively electrically operated, therefore battery-operated, vehicle, but the traction battery system 1 can also be designed in a manner assisting a further drive, not illustrated in any detail, for example an internal combustion engine, wherein the motor vehicle 2 would therefore be designed in the form of a partially electrically operated motor vehicle 2.

The battery modules 4, 5 are fastened to the shell 6. They are fastened in such a way that, in the event of a force acting on side faces 11 of the body 3, the sills 4, 5 being constituent parts of said side faces, for example as a result of an impact or crash against the side faces 11, the acting forces are partially, in particular for the most part, absorbed by the battery module housings 10.

A battery assistant module 13 having an assistant module housing 26, which battery assistant module comprises a battery management system 14 and an integrated power system 15 in the present exemplary embodiment, wherein the battery management system 14 has a battery management system housing 16 and the integrated power system 15 has a power system housing 17, is further accommodated in an accommodation space 12 of the body 3, which accommodation space accommodates the battery modules 8, 9. That is to say, in other words, that in the present exemplary embodiment the assistant module housing 26 comprises the battery management system housing 16 and the power system housing 17 which is formed independently of the battery management system housing 16. Similarly, the battery assistant module 13 could consist only of the battery management system 14 or only of the integrated power system 15.

The battery management system 14, which is also referred to as BMCe, has a temperature and voltage monitoring arrangement, contactors and a pyrofuse. The integrated power system 15 comprises a charger, a DC/DC converter, an AC/DC converter and a heater of a battery temperature-control circuit.

The battery management system 14 and the integrated power system 15 are arranged next to one another in the direction of the body transverse axis Y and in series in relation to the battery modules 8, 9, therefore opposite the second battery module 9 in the present exemplary embodiment, in the direction of the body longitudinal axis X, wherein they are positioned behind the battery modules 8, 9 in the direction of travel, see arrow. Therefore, just like the battery modules 8, 9, they lie in a load path of an action of force against the side faces 11 and therefore likewise have to bear a portion of the force which acts on the side faces 11 in the event of an impact or crash.

The two housings 16, 17 are of media-tight, in particular water-tight, design, wherein the housings 16, 17 are designed separately from one another in the direction of the body transverse axis Y in a manner optimized in respect of installation space. In order to create a load path starting from the first sill 4 to the second sill 5 and vice versa, a load-transmitting element 18 which implements a connection between the two sills 4, 5 is formed, wherein an electromagnetic shield is formed with the aid of the load-transmitting element 18 together with the housings 16, 17. The load-transmitting element 18 is designed for absorbing a large, in particular predominant, portion of the forces which act on the side faces 11 in the event of application of pressure. The two housings 16, 17 are designed for stabilizing the load-transmitting element 18 against kinking, in particular in the direction of the body transverse axis Y.

The battery assistant module 13 having the load-transmitting element 18 is designed in the form of a preassembly of the traction battery system 1, wherein the housings 16, 17 have connecting points 22 for fastening the load-transmitting element 18. The connection of the load-transmitting element 18 to the housings 16, 17 is preferably implemented in the form of a nonpositive connection, preferably in the form of a screw connection. The connecting points 22 serve to screw the housings 16, 17 to a battery frame or to the shell 6.

Figure 2:
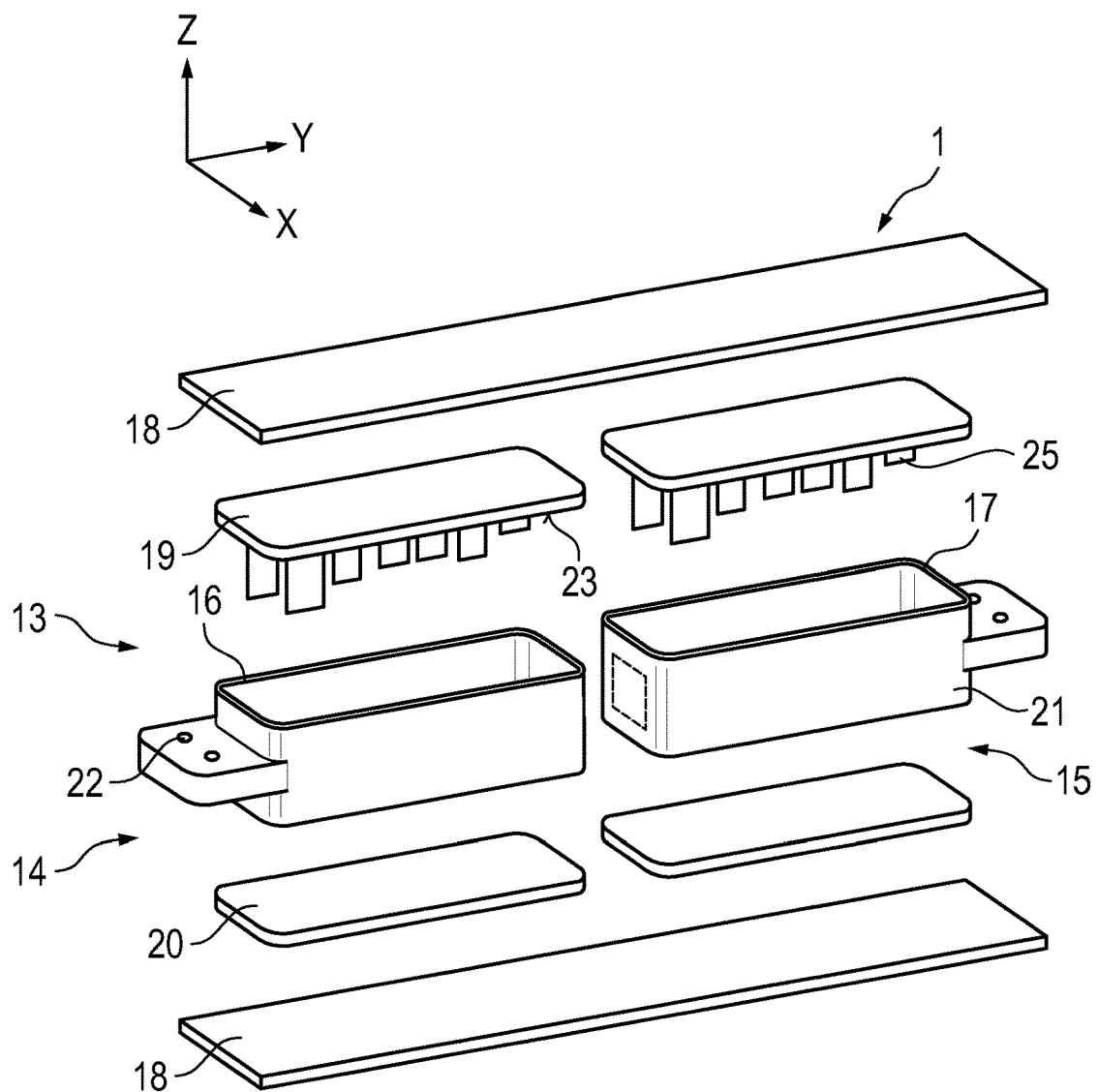
FIG. 2 shows a perspective illustration of a detail of the traction battery system according to FIG. 1 in the region of a load-transmitting element.

FIG. 2 depicts the battery assistant module 13 having the battery management system 14 and the integrated power system 15 in detail. The battery management system housing 16 and the power system housing 17 are each of rectangular design, wherein a frame 21, which is preferably produced from an aluminum, in particular in the form of an aluminum casting, is formed between a first cover 19 and a second cover 20 which are preferably produced from a plastic. Similarly, the frame could also be produced in the form of a forged part. The connection of the covers 19, 20 to the frame 21 is preferably formed with the aid of a nonpositive connection, preferably in the form of a screw connection.

The frame 21 has the connecting points 22 in the form of openings which are designed in a manner receiving, for example, the screws for connecting the housing 16; 17 to the shell 6 or to the battery frame. The covers 19, 20, in particular the first cover 19 which is arranged situated at the top in the direction of the body vertical axis Z, has high-voltage components 25.

The load-transmitting element 18 can be directly connected to the cover 19; 20, preferably by way of a screw connection. Similarly, the load-transmitting element 18, which is designed in a manner extending continuously from the first sill 4 to the second sill 5, can be designed in a manner replacing the covers 19; 20. In the present exemplary embodiment, this would mean that, for example, the first cover 19, which is situated at the top, of the two housings 16, 17 would be replaced by the load-transmitting element 18 which is arranged situated at the top. A design, which creates the leaktightness, of an element face 23 which is designed facing the frame 21 can be implemented here.

In the present exemplary embodiment, two load-transmitting elements 18 are provided. The load-transmitting element 18 is attached immediately above and below the covers 19, 20, so that, for servicing work, the load-transmitting element 18 and the cover 19; 20 which is positioned in an adjoining manner can be removed and therefore direct access to components 25 of the battery assistant module 13 that are arranged in the interior of the housing 16; 17 is possible, without the housing 16; 17 having to be released from its connecting point 22.

Figure 3:
FIG. 3 shows a longitudinal section through the load-transmitting element of the traction battery system.

FIG. 3 illustrates a section through a preferably extruded load-transmitting element 18 which has, in addition to its force-absorbing function, a cooling function for controlling the temperature of the battery modules 4, 5 and, for this purpose, has cooling ducts 24 through which media can flow.

What is claimed:

1. A traction battery system of an electrically operable motor vehicle, wherein the traction battery system comprises:
   a traction battery in the form of an underfloor battery comprising at least one first battery module and one second battery module, and
   a battery assistant module having an assistant module housing and configured for operating the first and second battery modules,
   wherein the first and second battery modules and the battery assistant module are oriented in series in relation to one another in a direction of a body longitudinal axis (X) of a body of the electrically operable motor vehicle, and are configured to be arranged between a first sill and a second sill of the body, and
   wherein the battery assistant module includes a load-transmitting element for transmitting forces acting on side elements of the body, which load-transmitting element is configured to extend from the first sill to the second sill in a direction of a body transverse axis (Y) of the body,
   wherein the battery assistant module is formed from a battery management system and an integrated power system, wherein the assistant module housing is formed from a battery management system housing of the battery management system and a power system housing of the integrated power system, and
   wherein the battery management system housing and the power system housing are arranged side by side in the direction of the body transverse axis (Y),
   wherein the battery management system housing and the power system housing are separate housings, and the load-transmitting element covers both the battery management system housing and the power system housing.

2. The traction battery system as claimed in claim 1, wherein the first and second battery modules are of load-bearing design.

3. The traction battery system as claimed in claim 1, wherein the load-transmitting element is stabilized against kinking with the aid of the battery assistant module.

4. The traction battery system as claimed in claim 1, wherein the load-transmitting element is configured to be fastened to the body with the aid of connecting points which are formed on the assistant module housing.

5. The traction battery system as claimed in claim 4, wherein the load-transmitting element is connected to the assistant module housing with the aid of a nonpositive connection in the form of a screw connection.

6. The traction battery system as claimed in claim 1, wherein the load-transmitting element is a cover of the assistant module housing.

7. The traction battery system as claimed in claim 1, wherein the load-transmitting element is produced in an extruded manner.

8. The traction battery system as claimed in claim 1, wherein the load-transmitting element includes a cooling duct.

9. The traction battery system as claimed in claim 1, wherein a cover of the assistant module housing is connected to a frame of the assistant module housing with the aid of a non-positive connection in the form of a screw connection.

10. The traction battery system as claimed in claim 1, wherein a cover of the assistant module housing is produced from a plastic and/or a frame of the assistant module housing is produced in the form of a cast or forged part.

11. A motor vehicle having an electric drive and the traction battery system of claim 1 arranged between the first sill and the second sill of the body of the motor vehicle.

12. The motor vehicle as claimed in claim 11, wherein each battery module extends from the first sill to the second sill.

13. The traction battery system as claimed in claim 8, wherein the cooling duct extends along the body longitudinal axis (X).

14. The motor vehicle as claimed in claim 11, wherein the battery management system housing includes a first flange having connection points that are connected to the motor vehicle body, and the power system housing includes a second flange having connection points that are also connected to the motor vehicle body.

15. The motor vehicle as claimed in claim 14, wherein the first and second flanges extend in opposite directions.

16. The traction battery system as claimed in claim 1, wherein the load-transmitting element forms a top cover of the assistant module housing, and a second load-transmitting element forms a bottom cover of the assistant module housing, and wherein the battery management system housing and the power system housing are positioned between the top and bottom covers.

17. The traction battery system as claimed in claim 16, wherein a cover for the battery management system housing is sandwiched between the load-transmitting element and the battery management system housing, and a cover for the power system housing is sandwiched between the load-transmitting element and the power system housing.

18. The traction battery system as claimed in claim 17, wherein the cover for the battery management system housing includes projections that are configured to extend within a hollow area of the battery management system housing.

19. The traction battery system as claimed in claim 17, wherein the load-transmitting element is not positioned beneath the at least one first battery module and the at least one second battery module.

* * * * *